United States Patent [19]
Hobbs

[11] Patent Number: 5,138,826
[45] Date of Patent: Aug. 18, 1992

[54] PEANUT COMBINE
[76] Inventor: Oliver K. Hobbs, 1202 W. Point Dr., Suffolk, Va. 23434
[21] Appl. No.: 599,038
[22] Filed: Oct. 17, 1990
[51] Int. Cl.$^5$ ............................................. A01D 29/00
[52] U.S. Cl. .................................... 56/14.6; 56/327.1; 460/13; 460/76; 460/126
[58] Field of Search ..................... 56/327.1, 13.3, 14.6; 460/13, 83, 76, 126, 128, 129, 143, DIG. 904

[56] References Cited
U.S. PATENT DOCUMENTS

| | | | |
|---|---|---|---|
| 3,983,683 | 10/1976 | James | 56/364 |
| 4,000,747 | 1/1977 | Rodger | 460/128 |
| 4,136,507 | 1/1979 | Hobbs | 56/16.6 |
| 4,640,085 | 2/1987 | Rupprecht | 56/14.6 |
| 4,696,151 | 9/1987 | Hobbs . | |

Primary Examiner—Terry Lee Melius
Attorney, Agent, or Firm—Stevens, Davis, Miller & Mosher

[57] ABSTRACT

A peanut combine is provided having a header for lifting peanut laden vines off the ground, an auger for distributing the peanut laden vines, a series of picking or thrashing cylinders for thrashing the peanut laden vines and a series of separator cylinders for removing the peanuts from the peanut laden vines. The separator cylinders include fingers which propel the vines and which rotate at variable speed. The fingers include tips which vary in angle with respect to the path which the fingers define as they rotate on the separator cylinders.

8 Claims, 9 Drawing Sheets

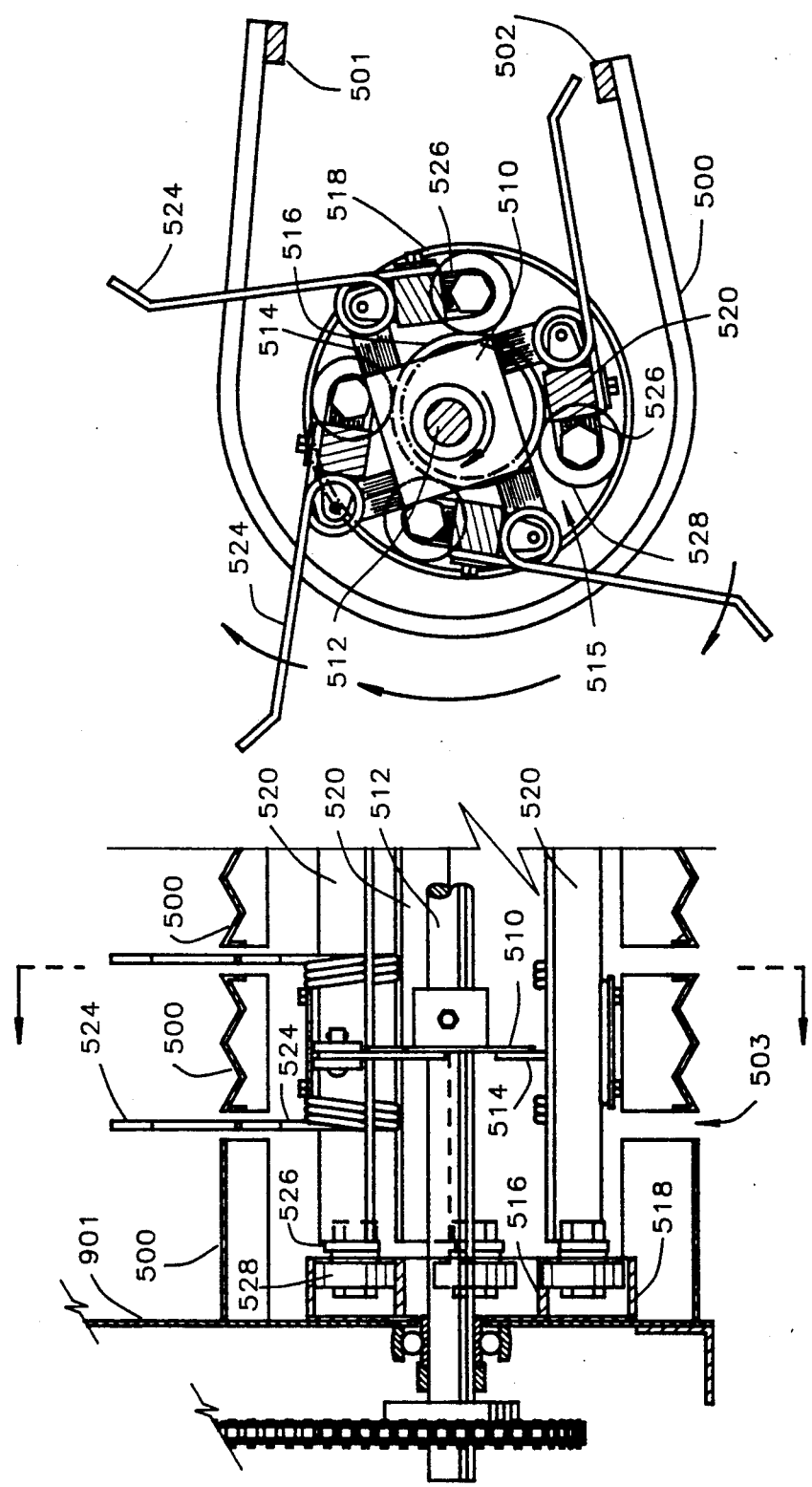

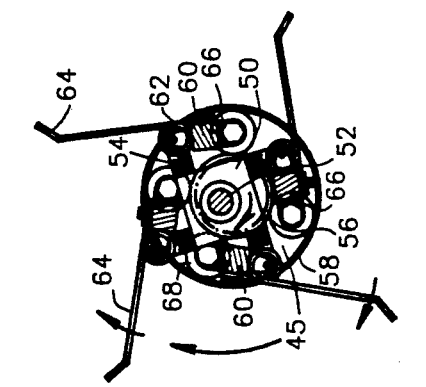
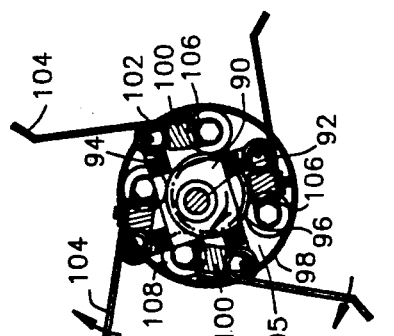
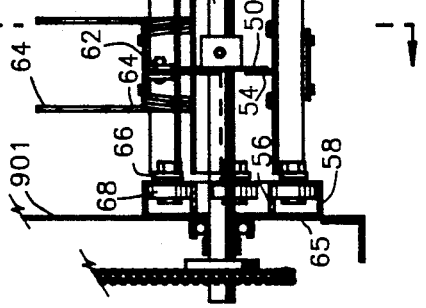
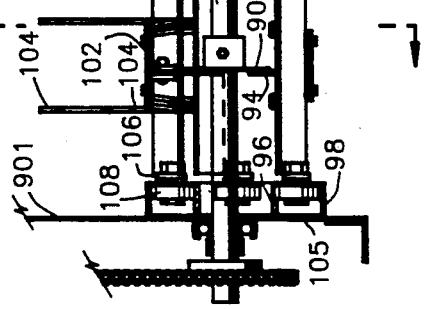
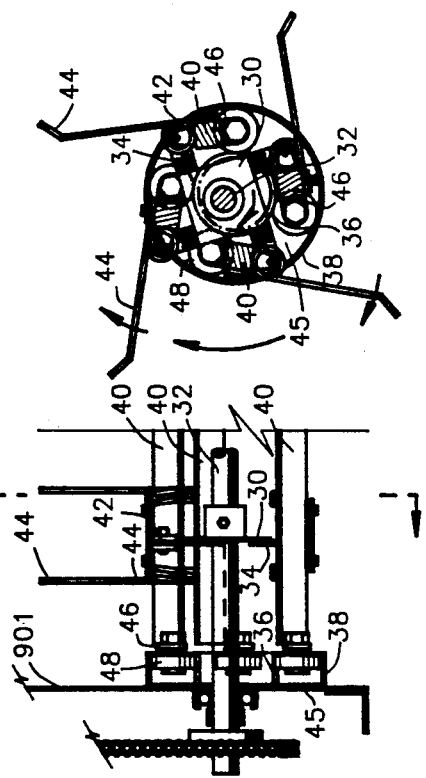
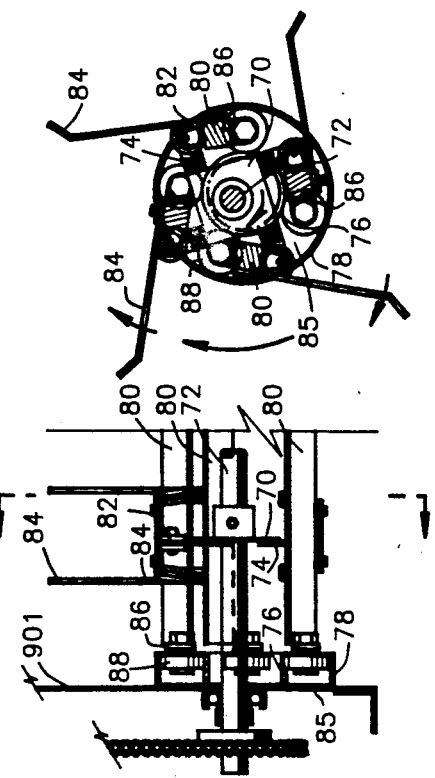

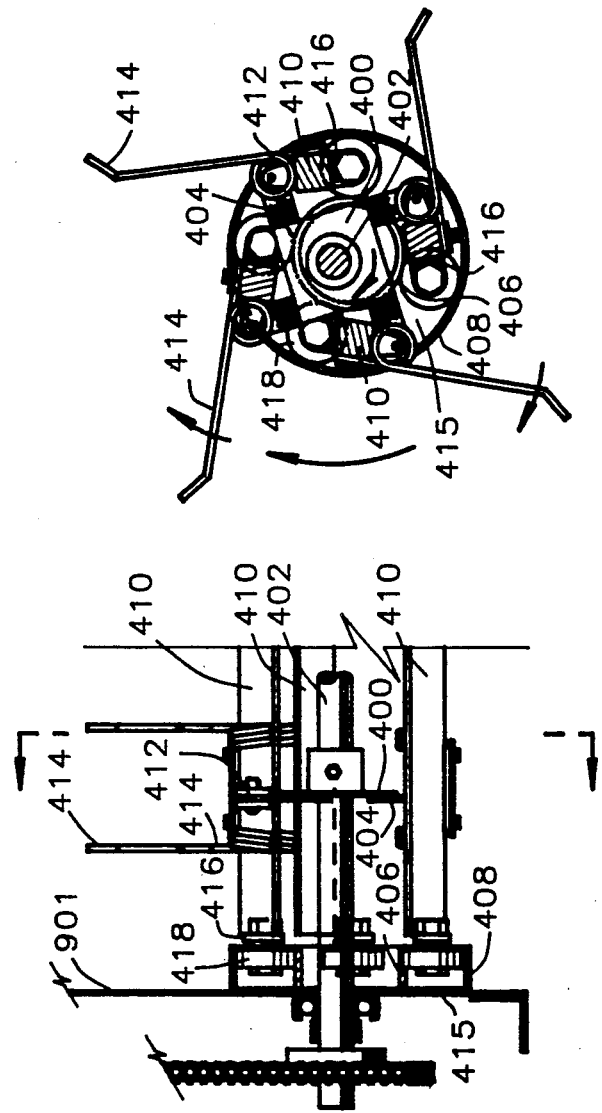

PEANUT COMBINE

BACKGROUND OF THE INVENTION

This invention relates generally to a peanut combine and more particularly to a straw separator system for such a combine. Peanuts grow underground and are attached to the roots of vines which are above the ground. A peanut crop is harvested by digging peanut laden vines from the ground, shaking as much dirt as possible from the roots, without detaching the peanuts and laying the peanuts on the ground in the windrows to dry. Digging machines place two rows in a single windrow, and the digger may be followed in a few hours by a side delivery rake which places two or three windrows into a single windrow. One commercially successful digger-shaker apparatus is described and claimed in my U.S. Pat. No. 3,319,720. After some drying in the fields, the peanut laden vines are picked up from the windrow and thrashed by a combine to separate the peanuts from the vines.

The character of peanut vines varies pronouncedly with the moisture content therein. When the vines are dry, they may be readily broken with a force of several ounces. When the vines are damp or when moisture is present, several pounds of force are required to break the vines. In threshing peanuts the moisture content of the vines being supplied to the machine for separation of the peanuts varies over a wide range. In one area of a field where soil is light and vines are small, rapid drying occurs so the vines have a low moisture content. In other areas of the same field where the soil is heavier or in shaded areas or when the humidity is high, drying takes place at a much lower rate so the vines have a relatively high moisture content. Accordingly, in any windrow or area during the feeding of the peanut combine, a wide variation of moisture conditions may be encountered. The volume of the vines in any given windrow varies when the vines are fed into a peanut picking machine, and the volume varies along with the moisture content of the vines. Peanut harvesting conditions additionally vary between different areas of the country. Climate conditions are relatively humid and cool in Virginia at peanut harvesting time, and very little wind blows except during a rainstorm. Heavy dew forms at night, and it is seldom that rain does not fall in a 5-day period. Peanuts are usually harvested within 10 days after they are dug. In contrast, climate conditions are relatively dry and hot in South Texas when peanuts are harvested. Skies are usually clear in general, but hot and dry and winds blow consistently. Little, if any, dew forms at night, and no light showers or rain falls on most windrows between the time peanuts are dug and when they are combined. In Virginia, ideal harvesting time is usually 7 days after digging, when under average weather conditions, normal average 20% moisture, vine juices and moisture have been absorbed or dried up, and vines are firm but not too tough to be torn apart without causing excessive peanut shelling. In contrast, in South Texas most peanuts are harvested when moisture content is around 5%, and vines are dry and brittle. The peanut combine is used to perform the operations of removing the windrows of peanut vines from the ground, picking the peanuts from the peanut vines, separating the peanuts from the peanut vines and bringing in the windrows, cleaning the peanuts and cutting the stems from the peanuts. This is accomplished by a header which removes the windrows from the ground, a picking cylinder which thrashes and transports the vines and a separator cylinder for removing the peanuts from the vine laden peanuts. Both the picking cylinder and the separator cylinder employ fingers for carrying the vine laden peanuts. The angle which the tip of fingers make with respect to the path the fingers travel is a measure of the aggressiveness.

DESCRIPTION OF THE PRIOR ART

U.S. Pat. No. 4,640,085 to Rupprecht discloses cylinders which are close relative to the center shaft for preventing grain from being thrown through the downstream cylinders as they rotate counterclockwise Fingers also propel the mixture of straw and small grain across concave separator grids which are set at negative angles to reduce aggressiveness. This prevents straw or other material from being carried over to cylinders and reduces secondary thrashing. This system is not acceptable in a peanut combine because excess shelling of the peanut would occur, and too much material, including peanuts, would be forced through a concave opening and the small openings would be plugged when vine type materials pass through the system.

U.S. Pat. No. 3,545,185 to C. Winfield et al discloses a pick up section which is wider than the thrashing and cleaning sections. The separatory chambers employ fingers which travel at a linear speed.

U.S. Pat. No. 4,408,618 to Witzel discloses fingers which may be retracted so as to swing between a generally radially extended position and a fully retracted stop position in which the axis of the fingers are inclined in the general direction of the housing axis in a downstream direction. Thus, as the rotor carries finger-like elements which intermittently penetrate and positively propel a portion of the mat without depressing the mat. The combination of the finger action and the motor providing the desired axial displacement movement engages the mat and results in the displacement of the mat.

Australian patent specification 236,092 discloses in FIGS. 1 and 2 a riddle or rotor elements which convey straw to the rear of the machine while the grain falls through. If used with peanut laden vines, the vines would be broken, shredded or wrapped around the cylinder shaft.

U.S. Pat. No. 4,136,507 to Hobbs discloses a vine pick up cylinder or header which rotates and accelerates fingers between about 4 o'clock and 12 o'clock position and decelerates fingers at a much slower speed between 12 o'clock and 4 o'clock. None of the above combines can achieve efficient separation of peanuts from their vines. Specifically, none of the above combines provides a separation cylinder which includes flexible fingers which change the angle with respect to the path and which rotate at various speeds.

Peanut machinery is generally described in my previous patents. U.S. patents to Hobbs including U.S. Pat. Nos. 4,184,314, 4,257,486, 3,866,752, 3,667,599, 3,693,835, 3,968,626, 3,989,111, 4,696,151, 4,136,507 and 4,162,811 are herein incorporated by reference in their entirety.

OBJECT OF THE INVENTION

It is an object of this invention to provide a peanut combine in combination with an improved separation system comprising a separator cylinder having a spring to engage vines and allow peanuts, which are not restrained, to fall between the spring fingers to a board down which they slide to an opening. A series of cylinders is provided so that material carried over an upstream cylinder is propelled to downstream cylinders. As many cylinders are supplied as required to separate higher volumes of material. Each cylinder includes flexible fingers that vary in speed as they travel, and to provide opposing fingers which meet with a relative high speed with respect to each other creating a flailing action that strips peanuts from their vines. The speed that one finger which is traveling upward is at a relative slow speed to avoid pitching the mat which contains peanuts and vines. Additionally, it is an object of the invention to provide a flexible finger which changes its angle with respect to its path so as to facilitate the removal of the vines from one cylinder and place them on another separator cylinder. A further object is to supply an aspirator cleaning system in combination with a shaker tray which can easily separate vines, leaves and other foreign material from the peanuts.

SUMMARY OF THE INVENTION

The foregoing objects and others are accomplished in accordance with the invention, generally speaking by providing in a peanut combine having a header for lifting peanut laden vines from a windrow as the combine is towed thereover with an auger having a right and left screw to spread the peanut vines from the relatively narrow windrow to the entire length of the peanut combine the improvements described herein. A picker system includes a series of four longitudinally spaced rotatable picker cylinders; each of the cylinders being disposed above screens which prevent dirt and other materials from entering a separator chamber but allows a peanut to enter therewithin. The four picking cylinders have a series of vine flow guides and intercepting means disposed about the pickup chamber which assists in directing a mat of peanut vines and peanuts to a series of five separating cylinders, which are in a separating chamber for separating the peanuts. The separator cylinders each have a series of bars which are placed about the periphery of cylinders. Flexible fingers are mounted on the bars to separate the peanuts. The flexible fingers on one cylinder oppose flexible fingers on another cylinder. These flexible fingers change angle with respect to the path which the tips of the fingers define, and the fingers move with varying speed. A series of disk separators is provided in a cleaning chamber under the separator cylinders for cleaning the peanuts from other foreign material; a shaker tray is provided under the disk separator with a series of disk-shaped saws for separating dirt and other debris from the peanuts. Air is blown over the falling peanuts between the disk separator and the shaker tray to assist in separating the dirt and any vine stems remaining on the peanuts. The peanuts fall to a series of disk-shaped saws and the shaker table which remove any stems on the peanuts and for discharging the destemmed peanuts from the bottom of the combine. Specifically, the peanuts enter a peanut funnel from which the peanuts are transferred to storage.

BRIEF DESCRIPTION OF THE DRAWINGS

The above and other objects, advantages and features of the invention will be more fully understood when considered in conjunction with the following discussion and the attached drawings, of which:

FIG. 7 is a front view of the header;

FIG. 7A is a side view of the header;

FIG. 8 is a front sectional view of a first separator cylinder;

FIG. 8A is a side view of the first separator cylinder;

FIG. 9 is a front sectional view of a second separator cylinder;

FIG. 9A is a side view of the second separator cylinder;

FIG. 10 is a front sectional view of a third separator cylinder;

FIG. 11 is a front sectional view of the fourth separator cylinder;

FIG. 11A is a side view of the fourth separator cylinder;

FIG. 12 is a front sectional view of the fifth separator cylinder; and

FIG. 12A is a side view of fifth separator cylinder.

DETAILED DESCRIPTION OF THE INVENTION

Figure 5:
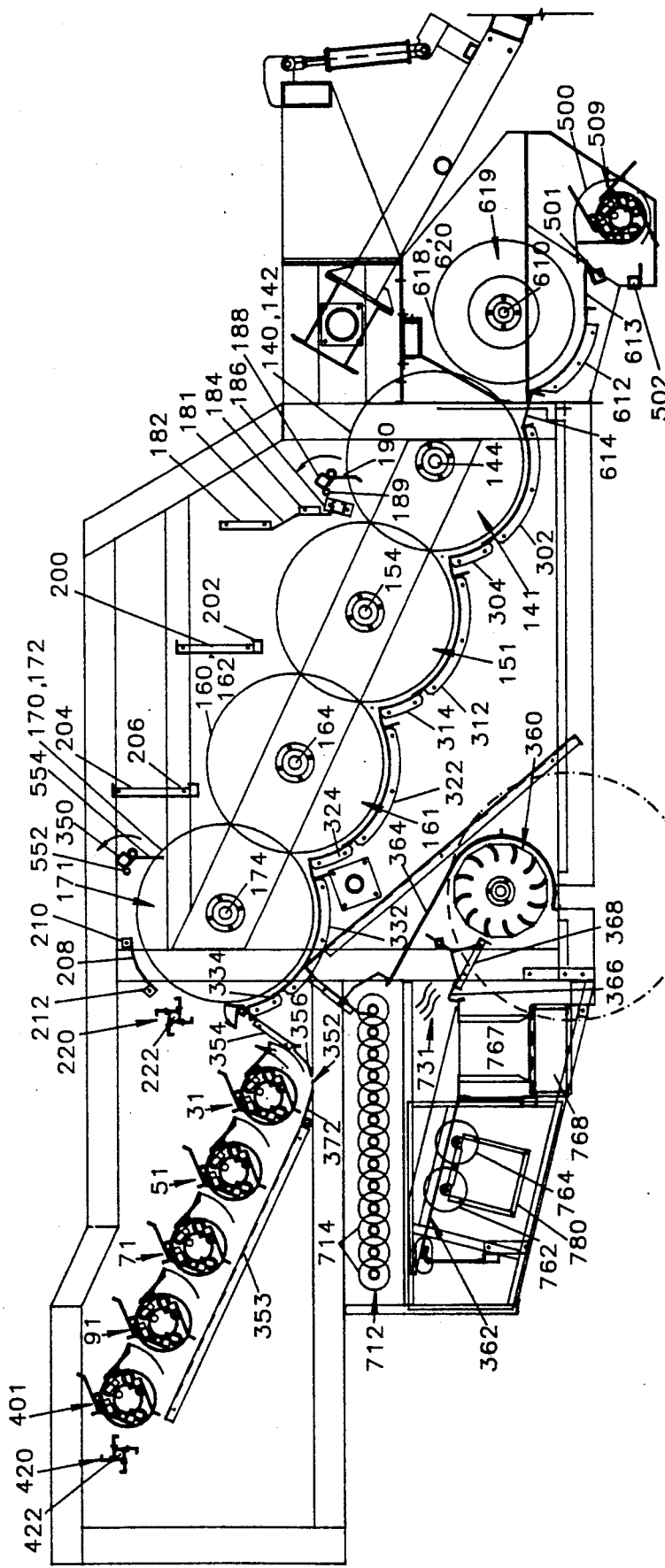
FIG. 5 is a fragmentary side elevation of a high capacity four row peanut combine which is designed for general harvest conditions.

As illustrated in FIGS. 5, 7A and 7B, header cylinder 509 or vine pick-up cylinder has a spaced stationary curve stripper plate 500 welded at the ends to bars 501 and 502. Bars 501 and 502 are fixed at their end to side walls 901 and 902 of the combine housing 903. Stripper plates 500 are evenly spaced along the front opening in housing 903 with slots 503. A shaft 518 is journaled at its end in side walls 901 and 902 and is within the space enclosed by stripper plate 500. A roller guide 515 having radially spaced concentric rims 516 and 518 is fixed to the inner surface of wall 901 with rims 516 and 518 eccentrically about shaft 512.

A square plate 510 in FIG. 7A is fixed to shaft 512 for rotation therein and in spaced relationship with wall 901. A similar plate 510A (not shown) is inwardly spaced from wall 90 and fixed to shaft 512 for rotation therewithin. Square plate 510 has an arm 514 fixed at each of its corners and projecting outwardly therefrom. As illustrated in FIG. 7A, the arms 514 are so disposed that one arm 514 projects outwardly from each side of the square plate 510. Square plate 510A carries similar arms 514A (not shown) at its corners, and the arms 514 and 514A are aligned with each other. A cross bar 520 is attached to each pair of oppositely disposed arms 514 and 514A and spans the distance therebetween. Each cross bar 520 extends beyond arms 514 and 514A into the space between the square plate 510 and side wall 901 and between square plate 510A and side wall 902. An arm 522 is fixed at one end to cross bar 520 and is pivotally fixed at its other end to each of the arms 514 while a similar arm 522A (not shown) is secured to cross bar 520 and is pivotally secured to the corresponding arm 514A carried by plate 510A. A bracket 526 is fixed to the side of bar 520 opposite the one which carries arm 514. A roller 528 is journaled on a shaft supported by bracket 526 and is disposed between rims 516 and 518 which act as a roller track for roller 528 as shaft 512 is rotated. Only one roller guide 529 is required so rollers and track guide are not required on adjacent wall 902. Otherwise, the structure of the vine pickup cylinder adjacent to wall 902 is identical to the one adjacent wall 901. Of course, if desired, rollers can be provided about both ends of shaft 512 in which case the structure about shaft 512 would be the same at each end of the vine pickup cylinder.

Flexible spring fingers 524 are spaced along bar 520 in alignment with slots 503 between stripper plates 500. As illustrated in FIG. 7A, rollers 528 and bars 520 will follow an eccentric path as shaft 512 rotates at an accelerated speed between about 4 o'clock and 12 o'clock as viewed in FIG. 7A and at a much slower speed from about 12 o'clock to 4 o'clock. Fingers 524 protrude through slot 503 to pick up vines from the ground under stripper plates 500 and carry the vines over to beyond the 12 o'clock position where the fingers are withdrawn and release the vines on the upper flat portion of stripper plates 500. Referring to FIG. 5, in the preferred embodiment the vine pick-up cylinder or header 509 feeds a auger cylinder 619 which has auger cylinder end plates 618 and 620 secured on auger shaft 610. Auger shaft 610 is secured to wall 901 and 902. Right screw (not shown) and left screw (not shown) are journaled to rotate on auger shaft 610 and to distribute the vines which are picked up from up to four rows of peanuts from the header to the first pickup cylinder. As seen from the header feeder, right screw turns clockwise to distribute the vines and left screw turns counterclockwise again to distribute the vines. As the vines traverse and are spread by the left screw and by the right screw, loose dirt falls from the auger 619 to concave screen 612. Concave screen 612 is secured at its end to each side wall 901 and 902 and spans the width of the picking chamber. Vines and peanuts which fall onto the concave screen 612 are swept up by the auger screw to pass these to the pickup chamber. Screen 612 is perforated to permit dirt to fall therethrough, but the perforations are too small for edible peanuts to pass. Concave screen 612 is connected to plate 613 which spans the width of the picking chamber and which is fixed to curved stripper plate 500. Concave screen 612 lies under auger cylinder, and the rear end of concave screen 612 abuts second plate 614 which spans the width of the picking chamber. Both first plate 613 and second plate 614 are secured at their ends to side walls 901 and 902.

Figure 4:
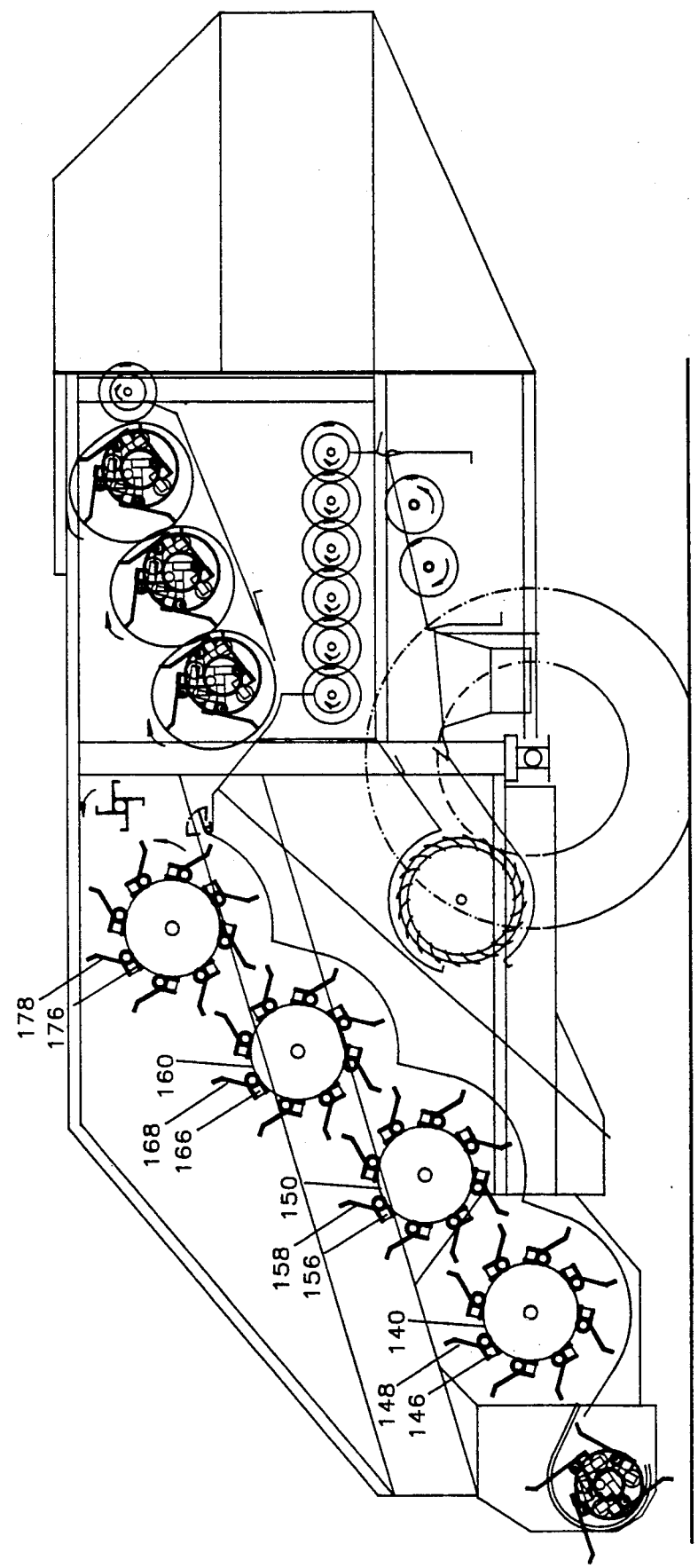
FIG. 4 is a fragmentary side elevation view of a peanut combine designed for predominantly dry harvesting conditions.

First picking cylinder 141 spans the space between side walls 901 and 902 and has cylinder end plates 140 and 142 fixed to shaft 144. Shaft 144 is journaled in side walls 901 and 902 of housing 900. As shown in FIG. 4, a plurality of bars are circumferentially spaced around the peripheries of circular end plates 140 and 142. The ends of bars 146 are welded or otherwise fixed to cylinder end plates 140 and 142. Each bar 146 carries a plurality of flexible fingers 148 laterally spaced throughout the length of bar 146. Flexible fingers 148 are spaced along the length of the bar 146 and 146A with each set of fingers 148 on one bar 146 staggered with respect to those on adjacent bar 146A so that no one set of fingers 148 on one bar 146 follows the path of a pair on an adjacent bar 146A as the cylinder rotates.

A second picking cylinder 151 which is identical to first picking cylinder 141 is disposed behind first picking cylinder with its longitudinal axis parallel to and above that of first picking cylinder 141 to receive the vines and peanuts from first picking cylinder 141. Cylinder 141 is disposed above screens 302 and 304, which are substantially concentric therewithin, and which spans the distance between walls 901 and 902. The spacing between cylinder and screens 302 and 304 is such that fingers 148 will contact peanut vines lying on screen 302 and 304 as cylinder 141 is rotated in a counterclockwise direction as viewed in FIG. 5 and to move the vines from screens 302 and 304. Concave screen 304 abuts screen 302, and screen 302 abuts plate 614. Above first picking cylinder 141 is a bent partitioning panel 181 which is suspended from the top of housing 903 and spans the width of the picking chamber. Bent partitioning plate 181 is reinforced at the top by divider panel 182 which is a rectangular panel traversing the picking chamber from side wall 901 to side wall 902. Similarly, divider panel 184 is a rectangular panel traversing the picking chamber between side walls 901 and 902 and is fixed to bent partition plate 181. A divider panel 186 extends from side wall 901 to side wall 902 at the bottom of the bent partitioning plate 181. Divider panel 186 forms a very small angle with respect to the vertical. Movable bar 188 is secured to shaft 189 which traverses the picking chamber between wall 901 and 902 and which is journaled to walls 901 and 902. Movable bar 188 rotate in both a clockwise and counterclockwise direction to strip vines carried by fingers 190 which are secured to bar 188 along the length of bar 188. Flexible fingers 190 intercept vines carried by flexible fingers 148.

A second picking or thrashing cylinder 151 is disposed behind cylinder 141. Cylinder 151 is disposed above screens 312 and 314 which join to form an arc which is substantially concentric with the peripheral edge of cylinder 151, and screen 312 abuts screen 304. Cylinder 151 has a pair of identical cylinder end plates 150 and 152 fixed to rotate with shaft 154. The ends of shaft 154 are journaled in side walls 901 and 902. The ends of bars 156 are welded or otherwise fixed to cylinder end plates 150 and 152. As shown in FIG. 4 a plurality of bars 156 are circumferentially spaced around the peripheries of cylinder end plates 150 and 152. Each bar 156 carries flexible spring fingers 158 with the flexible fingers 158 on one bar 156 being staggered along the length of bar 156 to follow a different path from those of the immediate adjacent bars 156A as cylinder 151 is rotated. Cylinder 151 spans the picking chamber and is rotated counterclockwise at a speed which is faster than the rotation of cylinder 141. Picking cylinder 151 is spaced longitudinally in combine 903 so that fingers 156 are above screens 312 and 314. As fingers 156 pass thereover, they will move vines lying on the screens 312 and 314 as cylinder 151 is rotated but allow dirt and other debris to fall through the perforated holes of screens 312 and 314.

Above cylinder 151 is dividing panel 200 which extends between side walls 901 and 902. The bottom of divider panel 200 is reinforced by bar 202 which extends between side walls 901 and 902.

A third picking cylinder 161 has identical circular laterally spaced end plates 160 and 162 secured to shaft 164 for rotation therewithin and is identical to second picking cylinder 151. The ends of shaft 164 are journaled in side walls 901 and 902. The ends of bars 166 are welded or otherwise fixed at one end to a end plate 160 and at the opposite end to end plate 162 (not shown). A plurality of bars 166 are circumferentially spaced around the peripheries of cylinder end plate 160 and 162. Each bar 166 carries flexible fingers 168 with the spring fingers 168 on one bar 166 being staggered along the length of the bar 166 to follow a different path from those of the immediate adjacent bar 166A as cylinder 161 is rotated. The configurations and dimensions of thrashing cylinder 166 are the same as cylinder 151. Cylinder 161 is rotated at a faster speed than cylinder 151. Cylinder 161 is disposed in spaced relationship above screens 322 and 324 which is substantially concentric with the periphery of end plates 160 and 162 and which include perforations to allow dirt and debris to fall through. Screen 324 abuts screen 322 which abuts screen 314 to form a continuous series of screens to allow dirt and other debris to fall through but retain peanuts and vine material.

Above the third picking cylinder 161, divider panel 204 spans the picking chamber and extends to the top of the picking chamber. Bar 206 supports the divider panel 204 and extends from side walls 901 and 902. Divider panel 204 forms a rectangular panel and extends between side walls 901 and 902.

A fourth picking cylinder 171 has identically circular laterally spaced end plates 170 and 172 fixed to shaft 174 for rotation therewith, the ends of shaft 174 are journaled in side walls 901 and 902. Bars 176 are secured at one end to a rim on end plate 170 and at the opposite end to end plate 172. Flexible fingers 178 are fixed along the length of bars 176 with fingers 178 on one bar 176 being in spaced relationship with those on the adjacent bars 176. The configuration and dimensions of picking cylinder 171 are identical to those of cylinder 161. Picking cylinder 171 is rotated at a faster speed than cylinder 161.

Cylinder 171 is disposed in spaced relationship above screens 332 and 334 which is substantially concentric with the periphery of end plate 170 and 172. Screen 334 abuts screen 332, and screen 332 abuts screen 324 to form a continuing series of screens. The space between periphery of cylinder 171 and screen 332 and 334 is such that fingers 178 are sufficiently close to screens 332 and 334 so as they pass thereover upon rotation of cylinder 171 to move any vines accumulated on screen 332 or 334 and allow an dirt and debris to fall through the perforations in screens 332 and 334.

A vine feed control assembly is disposed above cylinder 171. The feed control assembly has a shaft fixed near the top of picking chamber and traverses picking chamber between side walls 901 and 902. Stripper bar 350 is joined to shaft 352 and extends between side walls 901 and 902. Flexible fingers 554 are secured to stripper bar 350 and are spaced along bar 350. Flexible fingers 354 intercepts vines that are carried by flexible fingers 178.

A vine loading sensing member which opens and closes plate 360 varies the amount of vine fragments feeding the separating chamber. If the vines have a high moisture content, plate 360 is set back far enough to allow peanuts to be discharged in long sections. The long sections allow the vines to sustain the whipping action of the picking cylinders. Peanuts can be removed with a minimum of vine shedding. Average vine thickness is 2" but can vary from 0" to 3".

Under dry conditions, the vine loading sensing member sets plate 360 at approximately 1 o'clock for irrigated peanuts to assure that no small plant or plant sections with one or more peanuts attached would be discharged from the picking system. As vines are very brittle, plate 360 directs long vines back to the picking chamber where the long vines will be broken down to short vines. The shorter vines sections are transported in the separating chamber. These shorter vines have a sufficient rough texture so that they can form a mat which is a continuous band of vines and peanuts. Shaft 362 traverses the separating chamber and is journaled in side walls 901 and 902 and plate 360 is secured to shaft 362 and rotates with shaft 362 to control the flow of vines.

Stripper panel 208 is located above picking cylinder 171 and stripping panel 208, is concentric with the picking cylinder 171 and traverses the boundary between the separating chamber and the picking chamber. Between side walls 901 and 902, reinforcing bars 210 and 212 traverse the combine 903. Bar 210 traverses the picking chamber, and bar 212 traverses the separating chamber. Both bars 210 and 212 reinforce stripping panel 208 which traverses the distance between walls 901 and 902 and are located directly above vine load sensing member.

Attached to bar 212 is rotating stripping cylinder 220. Stripping cylinder 220 has four vanes secured to a shaft 222 which is journaled at its ends in side walls 901 and 902 and moves vines accumulated in front of stripper panel 208 into the separating chamber. Since the stripping cylinder 220 rotates in a clockwise direction opposite to that of cylinder 171, further shredding of the vines occur.

A dirt slide 230 accumulates dirt and other loose materials which has fallen through screens 312, 314, 322, 324, 332 and 334, and guides this dirt and debris to an opening in the bottom of the picking chamber. From this opening, the dirt and debris leaves peanut combine 903 and falls to the ground. An end of the dirt slide under picking cylinder 171 is elevated to impart an angle to the dirt slide 230 with respect to the horizontal to allow any dirt and debris that has accumulated on dirt slide 230 to slide to outside the peanut combine. The particular angle is not critical but must be sufficiently large so the dirt flows onto the ground.

Figure 1:
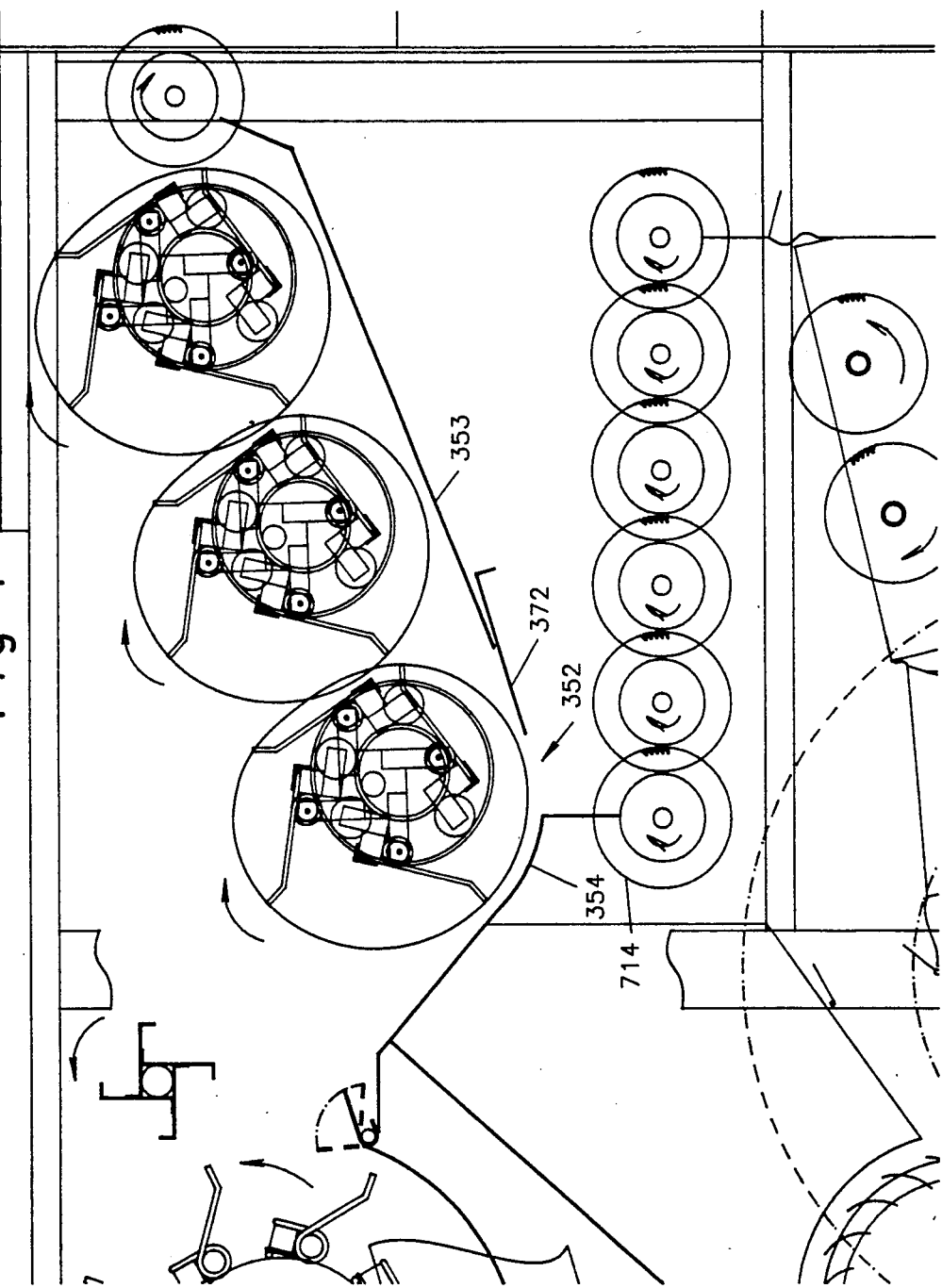
FIG. 1 illustrates an end section view of the straw separator and adjacent depending components.

As shown in FIGS. 1 and 5 the improved separating chamber of the present invention removes peanuts from their vine. As seen in FIGS. 4 and 5, the separation chamber comprises a plurality of separating cylinders for stripping peanuts from the vines. As can be appreciated from the FIG. 4 as the number of separating cylinders are increased, a greater number of peanuts are separated from the vines, and correspondingly a fewer number peanuts are discarded because it is too difficult to remove these peanuts from the vines. In a particular preferred embodiment, there are five separating cylinders. The increased volume of the mat requires additional cylinders to separate higher volumes of material as in FIG. 4. A high capacity combine to operate under firm or tough vine conditions is shown in FIG. 5.

As illustrated in FIGS. 8 and 8A, first separator cylinder 31 includes a shaft 32 which is journaled at its ends in side walls 901 and 902 and is within the space enclosed by the separator chamber. A roller guide 45 having axial spaced rims 36 and 38 is fixed to the inner surface of the wall 901 with rims 36 and 38 eccentrically located about shaft 32.

A square plate 30 is fixed to shaft 32 for rotation therewithin in a spaced relationship with wall 901. A similar plate 30A is inwardly spaced from wall 902 and fixed to shaft 32 for rotation therewithin. Square plate 30 has an arm 34 fixed at each of its corners and projecting outwardly therefrom as illustrated in FIG. 8A. The arms 34 are so disposed that one arm 34 projects outwardly from each side of the square plate. A cross bar 40 is attached to each pair of opposing disposed arms 34 and 34A and spans the distance therebetween. Each bar 40 extends beyond arms 34 and 34A into the space between square plate 30 and side wall 901 and between square plate 30A and side wall 902. A pivotal arm 42 is fixed at one end to bar 40 and is pivotally fixed at its other end to each of arms 34. While a similar arm 42 is secured to bar 40 and is pivotally secured to the corresponding arm 14 and carried by plate 30A. A bracket 46 is fixed to the other side of bar 40 opposite the one which carries arm 42. A roller 48 is journaled on a shaft supported by a bracket 46 and is disposed between inner rim 36 and outer rim 38 which acts as a roller track for roller 48 as shaft 32 is rotated. Only one roller guide 45 is required so rollers and track guide are not required adjacent to wall 902. Otherwise, the structure of the separator cylinders adjacent to wall 902 is identical to the one adjacent to wall 901 illustrated in FIG. 8A. Of course, if desired, rollers can be provided about both ends of shaft 32 in which case the structure about shaft 32 is the same at each end of the separator cylinder.

Figure 2:
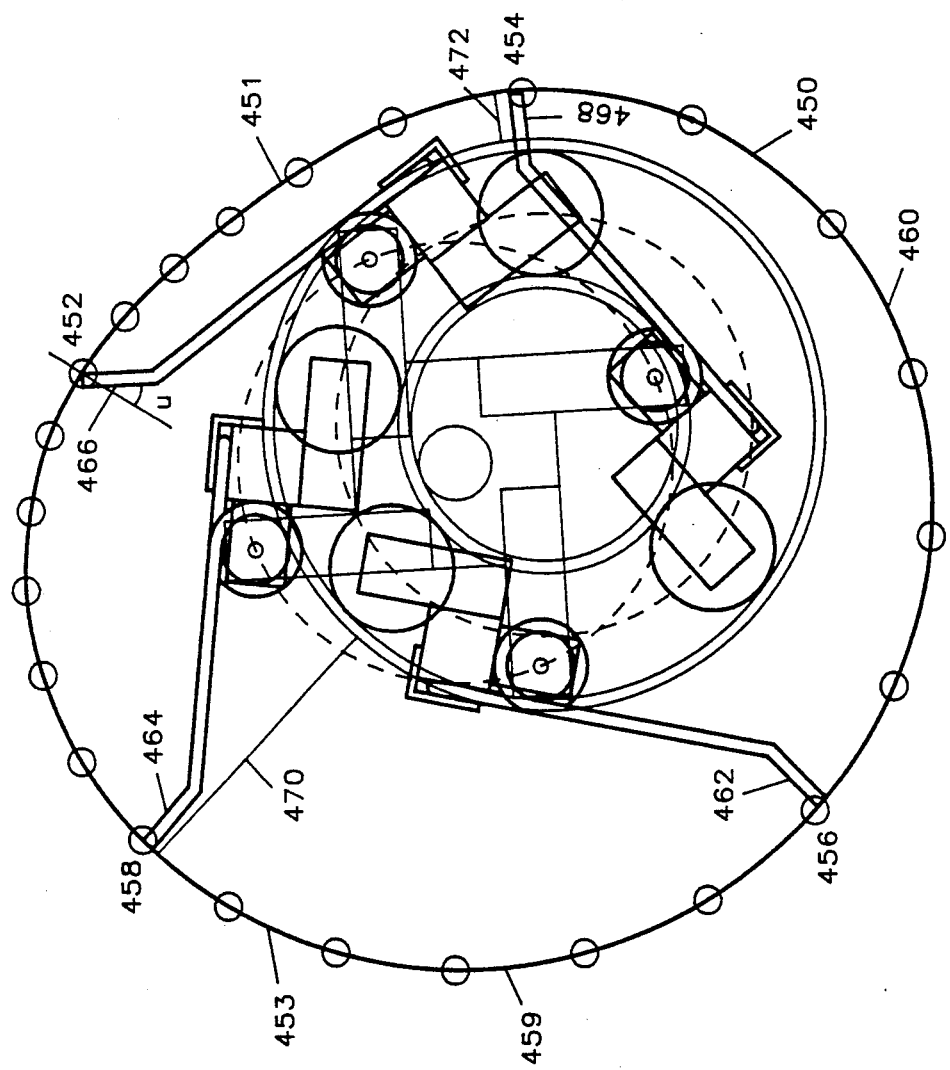
FIG. 2 is an enlarged end view of a separator cylinder assembly.

As in FIGS. 2, 8 and 8A flexible finger tip correspondingly moves in a eccentric path. The angle which flexible finger tip makes with respect to the path changes as the tip moves along the path. As the tip rotates from approximately 3 o'clock to approximately 11 o'clock the angle is substantially perpendicular to the path, yet from 11 o'clock to 3 o'clock the angle is less than 90°. This change in aggressiveness allows the peanut laden vines to be more easily removed.

Figure 3:
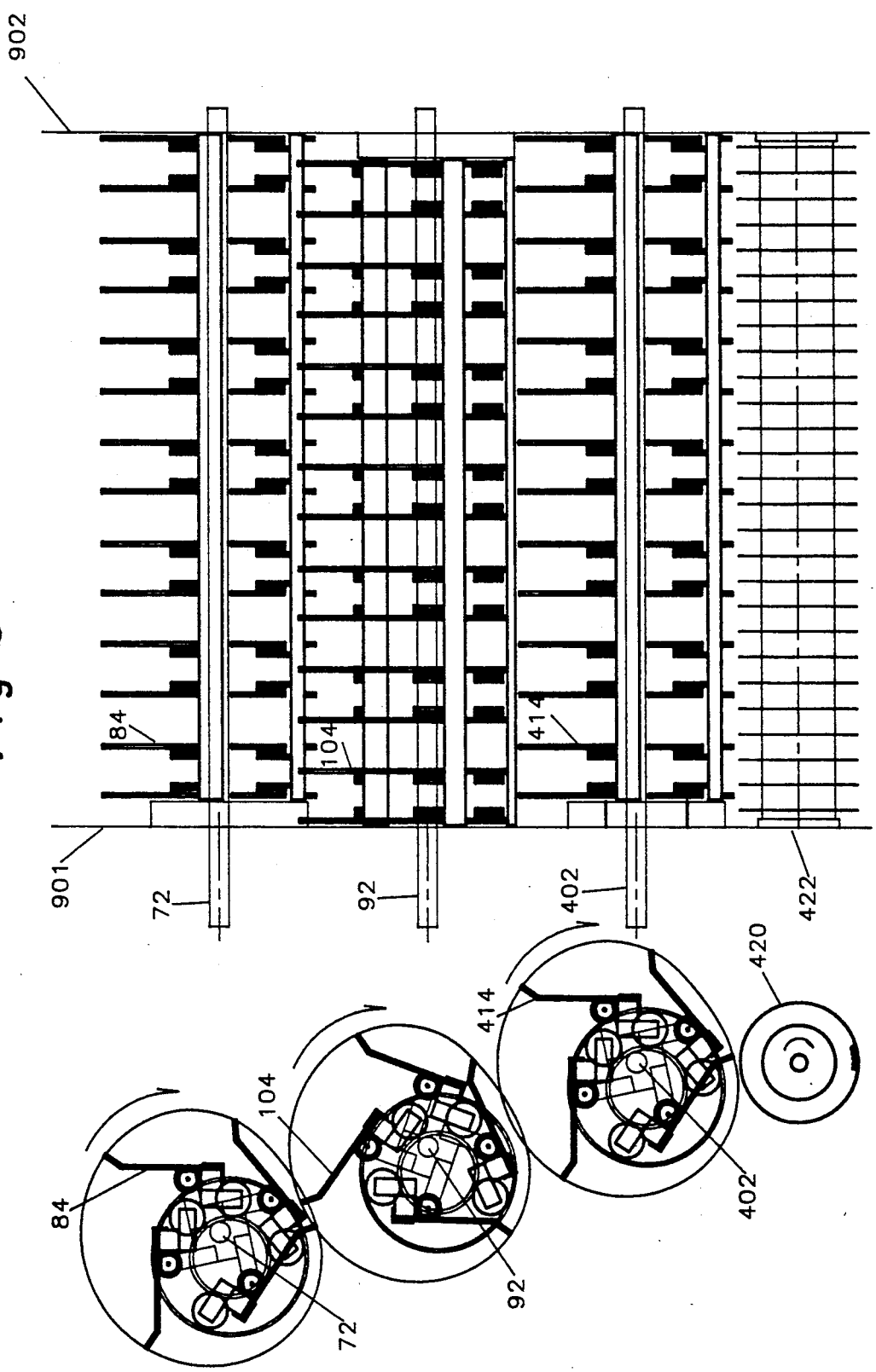
FIG. 3 is a top view of separator cylinders and doffer as it relates to the end view of the system.

Flexible spring fingers 44 are spaced along each bar 40 to interact with fingers 54, as illustrated in FIG. 3. Fingers 44 are staggered along bar 40 to follow a different path than fingers 64 on adjacent bar 60A. Roller 38 and bars 40 will follow an eccentric path at accelerated speed between about 2 o'clock and 5 o'clock and at a much slower speed about 5 o'clock to 2 o'clock. Below the first separator cylinder is a series peanut holes 352 and peanut guide 354. Series of peanut holes 352 extend from side wall 901 to 902 in peanut guide 354. Peanut guide 354 extends from screen 334 and is curved to meet peanut slide 353. Reinforcing plate 356 traverses the separator chamber and runs from side wall 901 to 902 and this reinforcing plate 356 reinforces peanut guide 354 and traverses the separating chamber between walls 901 and 902.

As the peanut vines are directed by the vine control board to the first separator cylinder 31, the fingers 44 engage the vines and result in the peanuts and smaller debris falling out. Peanuts which are not restrained by the vines fall between first separator cylinder 31 and peanut guide 354. Flexible fingers 44 are sufficiently close to peanut guide 354 so as peanuts may pass undisturbed as they travel to holes 352, yet any vines which are included among the traveling peanuts are picked up and carried by the flexible fingers 44.

As shown in FIG. 5, second separator cylinder 51 is located sufficiently close to first separator cylinder 31 so that flexible fingers 64 intercept vines which are carried by flexible fingers 44. As the peanut laden vines travel over separator cylinder 31, the vines are a size that a mat including peanut laden vines is formed, and the mat is agitated and torn apart allowing restrained peanuts to fall free. This mat is a continuous band of vines which extend between walls 901 and 902. As discussed above the vine control board feeds vines to separator cylinder 31. As flexible fingers 44 are accelerating, flexible fingers 64 are slower. As fingers 64 intercept the vine mat, the mat is bent and is spread apart to induce peanuts to fall out because part of mat is on fingers 44 while another part of the mat is on fingers 64. Peanuts lodged previously in the mat fall from the mat to peanut slide 353 and are carried to peanut hole 352. Because fingers 64 are slower, the mat is not pitched or thrown upwards. Second separator cylinder 51 is identical to first separator cylinder 31. Square plate 50 is fixed to shaft 52 for rotation therewithin in space relationship with wall 901. A similar plate 50A (not shown) is inwardly spaced from wall 902 and fixed to shaft 52 for rotation therewithin. Square plate 50 has an arm 54 fixed at each of its corners and projecting outwardly therefrom. As illustrated in FIGS. 9 and 9A, the arm 54 are so disposed that one arm 54 projects outwardly from each side of the square plate. Plate 50A carries similar arms 54A at its corners, and its arms 54 and 54A are aligned with each other. Cross bar 60 is attached to each pair of oppositely disposed arms 54 and 54A and spans the distance therebetween. Each bar 60 extends betweens arms 54 and 54A into the space between the square plate 50 and the side wall 901 and between square plate 50A and side wall 902. A pivotal arm 62 is fixed at one end to bar 60 and is pivotally fixed at the other end to each of the arms 54. A similar arm 62A is secured to bar 60 and is pivotally secured to the corresponding arm 54A carried by plate 50A. A bracket 66 is fixed to side of bar 60 opposite the one which carries arm 62. A roller 68 is journaled on a shaft which is supported by a bracket 66 and which is disposed between rims 54 and 56 which acts as a roller track for roller 68 as shaft 52 is rotated. Only one roller guide 65 is required so rollers and track guide are not required to adjacent wall 902. Otherwise, the structure of the separator cylinder adjacent to wall 902 is identical to the one adjacent to 901 illustrated in FIG. 5. Of course, if desired rollers can be provided about both ends of shaft 21 in which case the structure about the shaft 52 is the same at each end of separator cylinder.

Flexible spring finger 64 is spaced along each bar 60 to receive the vines from first separator cylinder 31 over second separator cylinder 51 as illustrated in FIG. 5. Rollers 68 and bars 60 follow an eccentric path at an accelerated speed between about 2 o'clock and 5 o'clock as viewed in FIG. 9A and at a much lower speed from about 5 o'clock to about 2 o'clock.

Fingers 64 pick up vines from first separator cylinder 31 and carry the vines over to beyond the 12 o'clock position where they are withdrawn by third separator cylinder 71. As flexible fingers 64 are moving at a faster speed flexible fingers 84 are slower. As flexible fingers 64 intercept the vine mat, the mat is bent because part of mat is on fingers 64 while another part of the mat is on fingers 84. Peanuts lodged previously in the mat fall from the mat to peanut slide 353 and are carried to peanut hole 352. Because fingers 84 are slower, the mat is not pitched or thrown upwards.

As in FIGS. 2, 9 and 9A flexible finger tip correspondingly moves in a eccentric path. The angle which flexible finger ti makes with respect to the path changes as the tip moves along the path. As the tip rotates from approximately 3 o'clock to approximately 11 o'clock the angle is substantially perpendicular to the path, yet from 11 o'clock to 3 o'clock the angle is less than 90°. This change in aggressiveness allows the peanut laden vines to be more easily stripped.

Third separator cylinder 71 is identical to second separator cylinder 51 and intercepts the vines from second separator cylinder. As in FIGS. 10 and 10A a square plate 70 is fixed to shaft 72 for rotation within a space relationship with wall 901. A similar plate 70A (not shown) is inwardly spaced from wall 902 and fixed to shaft 72 for rotation therewithin. Square plate 70 has an arm 74 fixed to each of its corners and projecting outwardly therefrom. As illustrated in FIGS. 10 and 10A, the arm 74 are so disposed that one arm 74 projects outwardly from each side of the square plate. Plate 70A carries similar arms 74A (not shown) at its corners, and arms 74 and 74A and spans the distance therebetween. Each bar 80 extends beyond arms 74 and 74A into the space between plate 70 and side wall 901 and between square plate 70A and side wall 902. A pivotal arm 82 is fixed at one end to bar 80 and is pivotally fixed to the other end to each of arms 74. A similar arm 82A (not shown) is secured to bar 80 and is pivotally secured to the corresponding arm 74A carried by plate 70A. Bracket 86 is fixed to the side of bar 80 opposite to the one which carries arm 74. A roller 78 is journaled on a shaft supported by a bracket 86 and is disposed between rims 76 and 78 which access a roller track for roller 78 as shaft 72 is rotated. Only one roller guide 85 is required for rollers, and a track guide is not required to adjacent wall 902. Otherwise, the structure of the separator cylinder adjacent to wall 902 is identical to the one adjacent to wall 901 illustrated in FIGS. 9 and 9A. Of course, if desired, rollers can be provided on both sides of shaft 72 in which case the structure about shaft 72 is about each end of separator cylinder 71.

Flexible fingers 84 spaced along each bar 72 interact with fingers 64 as previously discussed.

As illustrated in FIG. 10A, rollers 78 and bars 80 will follow a eccentric path at an accelerated speed between about 2 o'clock and 5 o'clock as viewed in FIG. 10A and at a much slower speed from about 5 o'clock to 2 o'clock. Fingers 84 pick up vines from second separator cylinder 71 and carries the vines over to beyond the 12 o'clock position where they are withdrawn and releases the vines to fourth separator cylinder 91. As flexible fingers 84 are moving at a faster speed, flexible fingers 104 are slower. As fingers 104 intercept the vine mat, the mat is bent because part of the mat is on fingers 84 and part of the mat is on fingers 104. Peanuts lodged previously in the mat fall from the mat to peanut slide 353 and are carried to peanut hole 352. Because fingers 104 are slower the mat is not pitched or thrown upwards.

As in FIGS. 2, 10 and 10A flexible finger tip correspondingly moves in a eccentric path. The angle which flexible finger tip makes with respect to the path changes as the tip moves along the path. As the tip rotates from approximately 3 o'clock to approximately 11 o'clock the angle is substantially perpendicular to the path, yet from 11 o'clock to 3 o'clock the angle is less than 90°. This change in aggressiveness allows the peanut laden vines to be more easily removed.

As illustrated in FIGS. 11 and 11A, a fourth separator cylinder 91 has its shaft 92 journaled at its ends in side walls 901 and 902 and is within the space enclosed by the separator chamber. A roller guide 105 having radially spaced concentric rims 96 and 98 is fixed to the inner surface of wall 901 with rims 96 and 98 eccentrically about shaft 92.

Square plate 90 is fixed to shaft 92 for rotation therewith in space relationship with wall 901. Similar plate 90A (not shown) is inwardly spaced from wall 902 and fixed to shaft 92 for rotation therewithin. Square plate 90 has a arm 94 fixed at each of its corners and projecting outward therefrom. As illustrated in FIG. 11A, the arms 94 are so disposed that one arm 94 projects outwardly from each side of the square plate. Plate 90A carries similar arms 94A (not shown) at its corners, and arms 94 and 94A are in alignment with each other. Cross bar 100 is attached to each pair of opposingly disposed arms 94 and 94A and spans the distance therebetween. Each bar 100 extends beyond arms 94 and 94A into a place between square plate 90 and side wall 901 and between square plate 90A and side wall 901. Pivotal arm 102 is fixed at one end to bar 100 and is pivotally secured to the corresponding arm 94 carried by plate 90A. A bracket 106 is fixed to the side of the bar 100 opposite the one which carries arm 102. Roller 108 is journaled on a shaft supported by a bracket 106 and is disposed between inner rim 96 and outer rim 98 which acts as a roller track for roller 108 as shaft 92 is rotated. Only one roller guide 105 is required so rollers and track guide are not required to adjacent wall 902. Otherwise, the structure of fourth separator cylinder 91 adjacent to wall 902 is identical to the one adjacent to wall 901 as illustrated in FIG. 5. Of course, if desired, rollers can be provided at both ends of shaft 92 in which case the structure about shaft 92 is the same at each end of the separating cylinder. Flexible fingers 104 are spaced along each bar 100 for receiving the vines from third separator cylinder 71. As illustrated in FIG. 11A, rollers 98 and bars 100 will follow a eccentric path in accelerated speed between about 2 o'clock and 5 o'clock as viewed in FIG. 5 at a much slower speed from about 5 o'clock to about 2 o'clock. Fingers 104 pick up vines from third separator cylinder 71 and carry the vines to beyond the 12 o'clock position where they are withdrawn and released to fifth separator cylinder.

As flexible fingers 104 are moving at a faster speed, flexible fingers 414 are slower. As fingers 414 intercept the vine mat, the mat is bent because part of the mat is on fingers 104 and another part of the mat is on fingers 414. Peanuts lodged previously in the mat fall from the mat to peanut slide 353 and are carried to peanut hole 352. Because fingers 414 are slower the mat is not pitched or thrown upwards.

As in FIGS. 2, 11 and 11A, flexible finger tip correspondingly moves in a eccentric path. The angle which flexible finger tip makes with respect to the path changes as the tip moves along the path. As the tip rotates from approximately 3 o'clock to approximately 11 o'clock the angle is substantially perpendicular to the path, yet from 11 o'clock to 3 o'clock the angle is less than 90°. This change in aggressiveness allows the peanut laden vines to be more easily removed.

As illustrated in FIG. 12A, a fifth separator cylinder 401 includes a shaft 402 journaled at its ends in side walls 901 and 902. Square plate 400 is fixed to shaft 402 for rotation therewithin in a spaced relationship with wall 901. A similar plate 400A (not shown) is inwardly spaced from the wall 902 and fixed to shaft 402 for rotation therewithin. A square plate 400 has an arm 404 fixed at each of its corners and projecting outwardly therefrom. As illustrated in FIG. 12A, the arms 404 are disposed so that one arm 404 projects outwardly from each side of the square plate. Plate 400A (not shown) carries similar arms 404A (not shown) at its corners, and arms 404 and 404A are aligned with each other. A cross bar 410 is attached to each pair of opposingly disposed arms 404 and 404A and spans the distance therebetween. Each bar 410 extends beyond arms 404 and 404A in a space between square plate 400 and side wall 901 and between square plate 400A and side wall 902. Pivotal arm 412 is fixed at one end to bar 410 and is pivotally fixed at its other end to each of arms 404. Similar arm 412A (not shown) is secured to bar 410 and is pivotally fixed at its other end to each of arms 404A. A similar arm 412A (not shown) is secured to bar 410 and is pivotally secured to the corresponding arm 404A carried by plate 90A. Bracket 416 is fixed to side of bar 410 opposite the one which carries arm 412. A roller 418 is journaled on a shaft supported by bracket 416 and disposed between outer rim 408 and inner rim 406 which acts as a roller track for roller 418 as shaft 402 is rotated. Only one roller guide 415 is required so rollers and track guide are not required at adjacent wall 902. Otherwise, the structure of the separating cylinder adjacent to wall 902 is identical to the wall 901. Of course, the desired rollers can be provided about both ends of shaft 402 in which case the structure about the shaft 402 is the same at each end of the vine pick up cylinder. Flexible fingers 414 are spaced along each bar 410. As illustrated in FIG. 12A rollers 418 and bars 410 will follow a eccentric path at an accelerated speed between about 2 o'clock and 5 o'clock and a much slower speed from about 5 o'clock to 2 o'clock. Fingers 414 pick up vines from fourth stripper cylinder 91 and intercept with the vanes of stripper cylinder 420.

As in FIGS. 2, 12 and 12A flexible finger tip correspondingly moves in a eccentric path. The angle which flexible finger tip makes with respect to the path changes as the tip moves along the path. As the tip rotates from approximately 3 o'clock to approximately 11 o'clock the angle is substantially perpendicular to the path, yet from 11 o'clock to 3 o'clock the angle is less than 90°. This change in aggressiveness allows the peanut laden vines to be more easily removed.

As shown in FIG. 2, the fingers include an upper section and a lower section. The lower section is essentially straight and fixed to the bar. However, the upper section is slightly bent toward the clockwise direction.

A typical separator is shown in FIG. 2. Finger path 453 indicates the path that the tips of flexible fingers traverse while they rotate about the shaft. The path is eccentric about the shaft because the shaft is not placed in the center of the roller guide. The flexible fingers path, speed characteristics and relatively finger angle vary as the position of the shaft is varied, but the shaft speed is constant. Positions tips of flexible fingers at 15° shaft rotation is indicated by circles on path 453. As in FIG. 2, the path is furthest from the roller guide at approximately 10 o'clock as shown by line 470, and the path 453 is closest to the roller guide at approximately 3 o'clock as shown by line 472. The path allows tip of finger to be correspondingly almost fully extended at position 459 which is an aggressive position, and almost fully retracted at position 454. This is advantageous because the fingers are almost fully extended as the fingers are receiving the mat from the downstream cylinder (not shown) and because the fingers are almost fully retracted as the cylinder is transferring the mat to the next upstream cylinder. Finger tip speed changes as a result of the shaft which rotates at a constant speed being placed in a noncentral location with respect to the roller guide. The speed of the tip is the highest at position 450 and of course accelerates up to that point, an speed is lowest at position 452 and the finger speed is decreasing from position 450 to position 452. This allows a relatively low speed at position 459 where the fingers accept the mat from the upstream cylinder, and thus, avoids pitching. However, this allows a relatively fast speed at position 454 as the fingers pass the mat to the downstream cylinder.

The speed at other points along path 543 varies nonuniformly. The actual finger tip speed depends not only on path position but on shaft speed. If the shaft speed was increased but was still constant, the speed at all points would correspondingly increase. Of course, the same relationship would occur is the shaft was slowed.

The same tip speed and tip angle characteristics could be achieved by a centered shaft and a eccentric roller guide.

The angle of the finger tip with respect to the path changes as the fingers traverse the path. At position 456 and 458 finger tips 462 and 464 are nearly perpendicular to the path, and this finger tip orientation is advantageous because the tips are aggressive and are able to readily pick up the vines from the upstream separator cylinder. This differs from the tip position at position 452 because the tip makes an angle with a perpendicular to the tip path. The bent upper tip in the clockwise direction decreases the angle with respect to the perpendicular. At position 452, the tip being bent at an angle $\phi$ results in the mat being easily removed from the tip. Of course, the larger the angle $\phi$ is, the easier the mat is to remove, but the mat should not be removed too easily because the mat must be bent to remove peanuts. This bent mat requires some resistance between the tip at position 452 and the mat material.

A factor which results in the change in the tip speed and the change in tip angle is a relationship of the position of the shaft to the center of the roller guide. As seen in FIG. 2, the shaft is near the inner rim, at approximately 11 o'clock. The roller guide coacts with the position of the shaft to attain the changes in tip speed and finger position. As the rollers in the roller guide move from approximately between 3 o'clock to 7 o'clock, the tip position moves from position 452 to position 454; the tip speed changes from the slowest at position 452 to the faster speed at position 454 (the fastest position is position 450). The speed of the shaft remains constant.

Just above and beyond fifth separating cylinder 401 is a stripping cylinder 420 which has four vanes rigidly secured to a shaft 422 which is journaled at its ends in side walls 901 and 902 and which moves vines from flexible fingers 414 of fifth separating cylinder to a storage area where vines are kept and later discarded or moved immediately outside of the peanut combine. As flexible finger 414 is accelerating in speed between 2 o'clock and 5 o'clock, vanes fixed to shaft 422 rotate at a constant speed. As the mat is carried by fingers 414 over cylinder 401, the mat contains few if any peanuts. If a sufficient number of peanuts remain in the mat additional separating cylinders would remove these peanuts. Correspondingly fewer cylinders could be employed to remove fewer peanuts. As shown in FIGS. 1, 3 and 4 another embodiment employs three separator cylinders.

Peanut slide 353 is fixed under fifth separator cylinder 401. Peanut slide 353 is a flat plate secured between side walls 901 and 902. Peanut slide 353 extends from beneath fifth separating cylinder but is forward of stripping cylinder 420. Peanut slide 353 is in a spaced relationship with each separator cylinder. This amount of separation between peanut slide 353 and each separating cylinder is sufficient that a peanut is free to move under each separator cylinder and not be pick up by the flexible fingers, yet a vine or other debris will be pick up by flexible fingers and returned to the separator cylinder. Some peanuts will become entwined with other vine material and be picked up by the finger of the separator cylinder which it is passing under. If too many peanuts cross holes 352 and do not enter, the holes 352 can be increased in size to allow additional peanuts to pass through during the first pass. Material lighter than peanuts will be carried across opening of holes 352. Some peanuts with stems attached will be carried over the separator cylinders. More material will cross and pass hole 352 under tough vine conditions, and the cleaning chamber can handle higher volume of material efficiently. Foreign material is much lighter and will be discarded by stripping cylinder 422. Holes 352 can be decreased in size if too much foreign falls through. The size of hole 352 is adjusted by board 354. Movable board 354 is in spaced relationship with cylinder 31 and traverses the separating chamber between walls 901 and 902. Board 354 is slidably mounted to slide 353 to allow the hole size to be adjusted. Small material such as vines can fall between spring finger or through separator cylinder as it becomes free throughout the length of the separator chamber.

Figures 6, 6A, 6B, 6C:
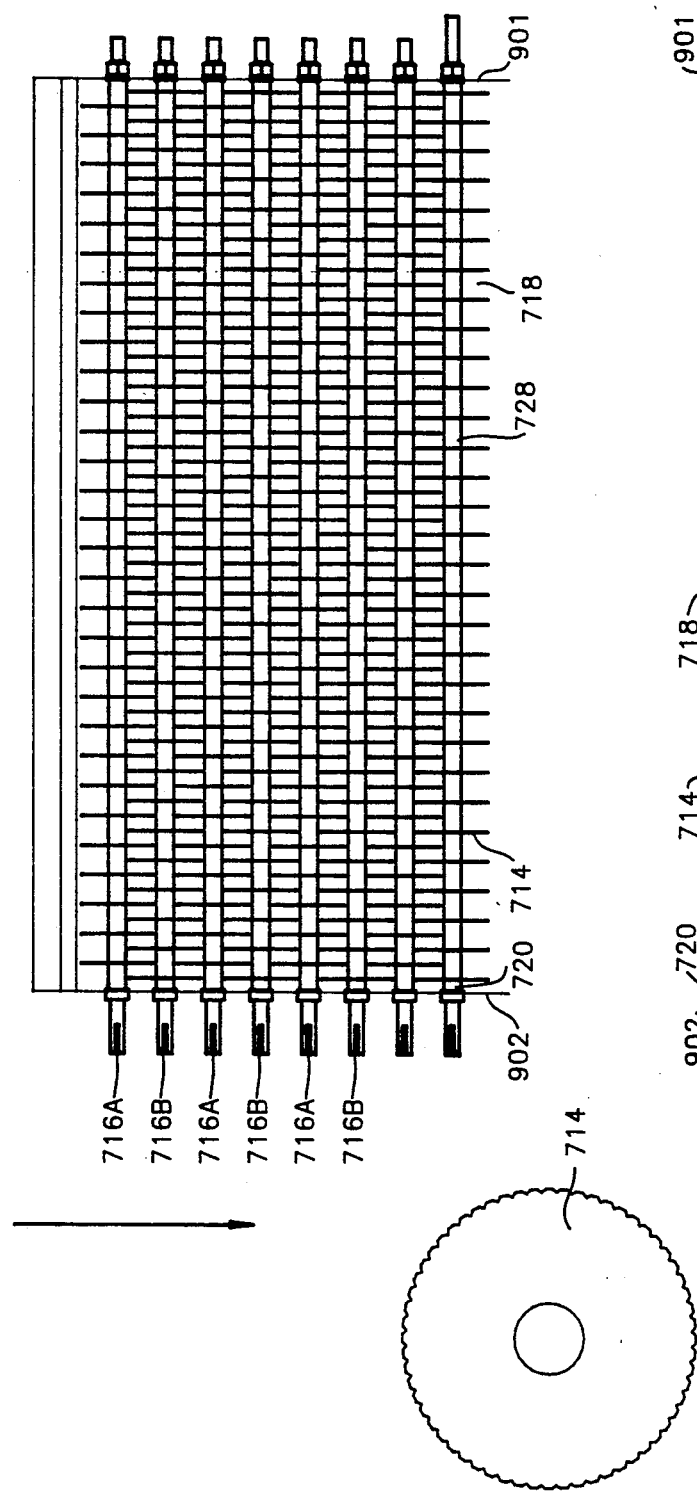
FIG. 6 is a top plan view of the improved disk separators of the present invention.
FIG. 6A is a enlarged sectional view of the improved disk separators of the present invention taken along line 3—3 to FIG. 2.
FIG. 6B is an side view of the disk separators of the present invention taken along line 4—4 of FIG. 2.
FIG. 6C is a side view of one of the disk separators of the present invention.

After the peanuts leave the separator chamber by hole 352, the peanut drops into the cleaning chamber for cleaning of all foreign material from the individual peanut. As shown in FIG. 6, the disk separator includes mounts (not shown) and a plurality of rotatable disk assemblies 712 supported on these mounts. As shown in FIG. 3 each of the flexible fingers 84 on bar 80 are staggered from fingers 104 on the adjacent bar 100. This staggering of fingers allow the mat to be pick up by the subsequent separating cylinder without fingers 84 from interfering with fingers 104. Fingers 84 are essentially aligned with fingers 414 on the third bar 402.

As shown in FIG. 6, each disk assembly 712 of the disk separator includes disks 714. The disks are positioned on shafts 716a, 716b which are journaled on wall 901, 902, and each disk is separated by a spacer 728. The spacers 728 have a length so as to give a spacing between adjacent disks for passage of a peanut. However, each subsequent disk assembly is positioned so that the disks on a second shaft 716b are positioned between the disks on a first shaft 716a which are separated by spacers 728. Adjacent shafts are separated by a distance as measured from the center of each shaft. The radius of each disk is almost that of the spacing between shafts, thus leaving only a small space between the periphery of a disk and the spacer of the shaft adjacent it. The placement of disk assemblies in this manner creates interdigitating disks having peanut-sized openings 718. Generally, any two disks on a like shaft and an interdigitating disk on an adjacent shaft will create two such small openings 718, as best shown in FIG. 6. Equal size openings, referred to as acceptors, are formed all the way across the operating width of the disk assembly by placing shafts adjacent to each other in the above-descried manner. As can be seen in FIG. 6, at each end of alternate shafts, a short spacer 720 is provided which causes the end disk to become almost flush with the end interdigitating disk on an adjacent shaft. This arrangement thus terminates the small openings and prevents material from becoming lodged between the disks and the side housing 901 of the combine.

As shown in FIGS. 6 and 6B, when rotary motion is imparted, all disks being driven in the same direction, to the disks by a suitable drive assembly, that part of each disk which serves as a boundary for an acceptor or opening moves in the opposite direction of the section of another disk which forms the opposing boundary. This arrangement prevents oversized debris, soil-caked peanuts, peanuts still attached to vine parts, or peanuts intermingled with vine parts from being accepted by that particular opening. The combination of motion and small openings are designed only to accept particles which are of a size equivalent to, or less than, the dimensions of a desired peanut. Any particle of size greater than these dimensions is conveyed past a first set of openings, over the disks, to a second set of openings positioned downstream from the first set. The motion over the disks to reach the second set of openings causes peanuts to lose chaff and caked soil, and to become free of vines and vine parts. When a peanut has lost its foreign material and has reached the desired dimensions mentioned above, it will be accepted through openings 718. Soil-laden peanuts and other large debris will be conveyed to the next and subsequent sets of openings to again be sized for acceptance.

The presence of a counter-rotating disk on an adjacent mandrel between each pair of disks on the same mandrel, which serves to form openings through which acceptable material will pass, eliminates plugging. Should particle start to become a lodged between two disks 714 on the same mandrel 716, the rotation of the disk 714 on an adjacent downstream mandrel 716 which rotates between the first two disks, would cause it to become dislodged.

Although the disk separator of the present invention works effectively to separate material when operating alone, its performance is greatly enhanced by the addition of an aspiration system, shown in FIG. 5, which operates within and in harmony with the mechanical disk system. In combination with the aspiration system, an air stream 731 (FIG. 5) is directed, in such a way that air will pass up between the disks 714 in a uniform flow over the surface of the disk assembly, causing leaves, vines and other light chaff to be lifted out of the desired peanuts and thus to be separated and blown out with the mechanically separated reject material. As material is fed onto the upstream end of the disk assembly in a layer, large material or matted material will bridge adjacent disk assembles 712 and ride the tops of the disks 714, while loose material drops through openings 718. If light enough, the material will be lifted by the air stream above the downstream disk assemblies and moved to the rear of the separator directed by the airflow. However, if long sections of vines pass through the aspiration cleaning system, these vines interfere with air and material flow and mats of material are formed. Air flow is deflected causing velocity to be greater in open areas of the separator chamber. Good peanuts crossing open areas will be blown out of the machine or on top of the mat of material.

Air is allowed to pass downstream as a result of disk spacers 728, which create a space between the outer perimeters of adjacent disks 714. The material layer is broken up by agitation of the disks and the air stream as the material is moved. Under average operating conditions, all material is separated by the time it passes the third row of disks; however, a number of additional rows may be provided to assure separation of matted or thick layers of material. Air is supplied by cleaning fan 360. The air is blown through a tunnel which is bounded on the sides by the walls 901 and 902 a shaker tray 362, flexible panel 366 and panel 368 on the bottom and panel 364 on the top. Shaker tray 362 and panel 364 both extend from walls 901 to 902. Flexible panel 366 is a flexible panel which extends from wall 901 to wall 902 and is fixed to shaker table 362 to provide a continuous tunnel as shaker table 362 moves. Flexible panel 366 is fixed to panel 368 which extends from wall 901 to wall 902 and which is fixed to cleaning fan 360 to form a bottom of the tunnel. Panel 368 is fixed to cleaning fan 360.

The peanuts accepted through openings 718 are directed to destemmer unit 780, shown in FIG. 5. The destemmer unit is composed of a series of cutting disks 762 and 764, which protrude between slots of the shaker tray 362 which supports fallen cleaned peanuts between the transversely spaced slots, as shown in FIG. 5. Shaker tray 362 and disk are mounted on a angle with respect to the horizontal to allow the peanuts to flow from the top of shaker tray to the bottom. The transverse spacing of the cutter disks 762 and 764 is such that peanuts roll therebetween and expose their remaining stems to the cutting disks. The stems are cut by the rotating disks, and the stems fall through the slots, out of the combine. The peanuts roll to the peanut funnel 767 and into jet tunnel 768 and are swept by an air stream at high velocity away from the jet tunnel 768 into a storage bin or hopper (not shown). Although described in connection with a specific peanut combine, it is to be understood that the improved separator of the invention could be used on a peanut combine which is either a two, four or a six row machine. The additional width requires larger shafts, wider blowers and larger separator systems. The width of thrashing and separator systems is 98 inches for a typical four row machine.

EXAMPLE

The windrows including peanuts and vines are stacked on the peanut field. Peanut combine 90 which is towed approaches the windrows and header 503 engages the vines and peanuts lifting them up over header 503 and into feeder auger 619. Auger 619 spreads the peanuts and vines by twin screws to a width which is approximately the width of the combine. The auger transfers the peanut laden vines to the first picking cylinder. Peanuts and vines are accepted by first picking cylinder 141 by flexible fingers, and any loose dirt falling from the peanuts and vines pass through holes found in concaves 302, 304 and fall onto the ground. Divider panel 181 which includes flexible fingers 190 forces the peanuts and vines onto first picking cylinder 141. The peanuts and vines are transferred from first picking cylinder 141 to second picking cylinder 151 and in turn transferred to third picking cylinder 161 and in turn transferred to fourth picking cylinder 171. During this successive transfer from first to fourth picking cylinder, loose dirt and accumulated debris falls to concaves and through holes in the concaves to a dirt slide and falls out onto the ground. Material such as vines and peanuts which are too large to fall through holes of the concaves are engaged by the flexible fingers of the picking cylinders and returned to the flow which are the successive of peanuts and vines. Behind fourth picking cylinder 171, a vine feed control assembly permits the vines and peanuts to pass into the separator chamber of the peanut combine. Picking board control returns vines to be transferred to the picking chamber where the long vines are broken down in long sections; the short vine sections form a mat and are directed to the separator cylinder. First separator cylinder 31 engages the mat of peanut laden vines and allows peanuts which are loose to fall to floor. The remaining peanuts and vines in the form of a mat are passed over first separator cylinder 31. The speed of the tips of the fingers are increased as they are raised over first separator cylinder. Small loose material can fall through the vines as the vines are engaged by the second separator cylinder 51. When the fingers of one separator cylinder and the fingers of another separator cylinder exchange the vines, the layer of vines and peanuts are bent and vibrated in the distance between the respective separator cylinders. While the speed is increasing the angle of the tip of the finger is changing with respect to the path of the fingers. The tips of fingers are approximately 90° when they receive the vines. At approximately 1 o'clock, the tip forms an angle with respect to the perpendicular of the path. However, this angle is continually changing as the tip of one finger approach the tip of a downstream separator cylinder which has a angle perpendicular to the path of the tip. This allows the vines to be easily removed. As the fingers of the downstream cylinder approach the finger of the upstream cylinder to lift the vine off, the speed of the fingers are reduced on the downstream separator cylinder to prevent the vines from being pitched. Between the separator cylinder, the mat is spread apart to induce peanuts to fall from the vines. The process continues between each pair of separating cylinders. A doffer 420 carries the vines away when the vines have yielded the peanuts. As the picking cylinders are removing the peanuts from the mat, short pieces of vines and peanuts fall to the peanut slide 353. These short pieces of vines are picked up by fingers of separator cylinders which are over the short pieces of vine. Peanuts are not picked up because they are relatively small and pass under the fingers by gravity but allowed to slide down and enter opening which is just peanut size. If a short section of vine is not picked up by the separating cylinder, the vine slides down the peanut slide 353 to a position under the upstream separating cylinder. Here the short piece of vine is lifted by the separator cylinder and returns to the mat of peanut laden vine.

In another embodiment as shown in FIGS. 1 and 4 the header feeds peanut laden vines directly to first picking cylinder 141; first picking cylinder 141 feeds in turn the vines to second picking cylinder 151. Second picking cylinder 151 in turn feeds third picking cylinder 161, and third feeding cylinder in turn feeds the vines to fourth feeding cylinder 171. The vines and peanuts enter the separating chamber by a picking control board and a doffer.

In the separating chamber the first separator cylinder in turn feeds second separator cylinder which in turn feeds third separator cylinder. The separator cylinders and picking cylinders are identical as in the preferred embodiment. The vines which have had their peanuts removed are discarded. In the preferred embodiment, the peanuts after falling through hole 352 enter the cleaning chamber. The peanuts enter a plurality of disk assemblies to remove oversized debris. An aspiration system blows loose debris from the peanuts. The peanuts pass to a destemmer unit where cutting disks 762 and 764 protrude between slots of the shaker tray 362. The destemmer unit removes peanut stems. The peanuts are subsequently placed into storage (not shown).

Although described in association with a peanut combine, it is to be understood that the invention provides a system for separating seeds or other products from straw or vine for a matted flow of mixed seeds and vine that is passed over separator cylinders equipped with spring fingers activated in such a manner that the vines will not wrap or join the cylinders as the mat is pulled apart.

Although the invention has been described in detail for the purpose of illustration it is to be understood that such detail is solely for that purpose and that those skilled in the art can make variations therein without departing from the spirit and scope of the invention except as it may be limited by the claims.

I claim:

1. In a peanut combine comprising a header for receiving cut peanut vines from the ground, at least one thrashing cylinder for carrying the peanut vines from the header, at least one picking cylinder for receiving peanuts from said peanut vines, and collecting means for collecting the peanuts in a central location, the improvement comprising:

a series of at least two rotatable separating cylinders located downstream of said at last one picking cylinder and within a space enclosed by first and second spaced apart walls of the combine, each said separating cylinder comprising:

a shaft disposed transversely between said walls;

a plurality of spaced apart rim supports, one said rim support being fixedly attached to each said wall, each said rim support comprising substantially circular inner and outer rims, each said rim support further comprising means for receiving said shaft at a position offset from the center axis of the rim support;

a plurality of rollers disposed in a track defined by said inner and outer rims of said spaced apart rim supports;

a plurality of cross bars comprising first and second ends, said first ends movably attached to a roller disposed between said inner and outer rims of a first rim support fixedly attached to said first side wall of said combine, said second ends of said cross bars removably attached to a roller disposed between said inner and outer rims of said second rim support fixedly attached to said second side wall of said combine;

a plurality of finger receiving means for receiving a plurality of flexible fingers circumferentially spaced apart on said shaft, said finger receiving means comprising means for pivotally mounting said plurality of cross bars in a spaced apart relationship around the circumference thereof, and;

a plurality of said flexible finger means mounted on each said cross bar, whereby when each said separating cylinder is rotated, said plurality of flexible fingers define an eccentric path of travel when viewed from either said first or said second end of said shaft.

2. A peanut combine as in claim 1 where said first separator cylinder rotates in the same direction as said second separator cylinder.

3. A peanut combine as in claim 2 wherein said direction of rotation is the clockwise direction.

4. A peanut combine as in claim 1 wherein said plurality of flexible fingers disposed on one said cross bar oppose a plurality of flexible fingers disposed on another said cross bar.

5. A peanut combine as in claim 1 wherein the speed of rotation of each said separator cylinder is variable.

6. A peanut combine as in claim 1, wherein said finger receiving means comprises a plate having a plurality of equidistant mounting means for mounting a flexible finger that is correspondingly mounted on a cross bar.

7. A peanut combine as in claim 1, wherein said plurality of flexible fingers comprise a spring having an arm extending therefrom, said arm bent at an angle at an end thereof.

8. A peanut combine as in claim 1, wherein said plurality of flexible fingers disposed on said cross bars are interdigitated by being spaced apart by predetermined distances for each said cross bar.

* * * * *